(12) United States Patent
Fujisawa et al.

(10) Patent No.: US 6,362,414 B1
(45) Date of Patent: *Mar. 26, 2002

(54) TRANSPARENT LAYERED PRODUCT AND GLASS ARTICLE USING THE SAME

(75) Inventors: Akira Fujisawa; Masahiro Hirata; Masatoshi Nara, all of Osaka (JP)

(73) Assignees: Kaneka Corporation; Nippon Sheet Glass Co., Ltd., both of Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,929

(22) Filed: May 26, 2000

(30) Foreign Application Priority Data

May 31, 1999 (JP) .............................. 11-152972
Mar. 22, 2000 (JP) ....................... 2000-080963

(51) Int. Cl.[7] ..................... C03C 17/245; C03C 17/34; E06B 3/66; H01L 31/04
(52) U.S. Cl. ..................... 136/256; 136/244; 136/251; 257/432; 257/434; 428/432; 428/326; 428/142; 428/141; 428/702; 428/701; 52/786.1; 52/786.13; 52/479
(58) Field of Search ................................ 136/256, 244, 136/251; 257/432, 434; 428/432, 326, 142, 141, 701, 702; 52/786.1, 786.13, 479

(56) References Cited

U.S. PATENT DOCUMENTS

| 4,732,621 A | 3/1988 | Murata et al. | |
|---|---|---|---|
| 4,808,462 A | * 2/1989 | Yaba et al. | 428/142 |
| 4,835,040 A | 5/1989 | Callies et al. | |
| 5,254,904 A | 10/1993 | Van De Leest et al. | |
| 5,393,563 A | 2/1995 | Ellis, Jr. | |

FOREIGN PATENT DOCUMENTS

| DE | 34 36 618 A1 | 4/1985 | |
|---|---|---|---|
| EP | 309902 | * 4/1989 | |
| EP | 0 309 902 A2 | 4/1989 | |
| EP | 0 597 490 A1 | 5/1994 | |
| EP | 0 782 975 A1 | 7/1997 | |
| JP | 60-77150 | 5/1985 | |
| JP | 61-288473 | 12/1986 | |

(List continued on next page.)

OTHER PUBLICATIONS

Sanyal et al, "Chemical vapour deposition of hot end coatings on glass from stannic chloride," Glass Technology, vol. 23, No. 6, Dec. 1982, pp. 271–276.*

Ruzakowski et al, J. Vac. Sci. Technol. B 14(6), Nov./Dec. 1996, pp. 3436–3444.*

P. Ruzakowski Athens et al., "Use of Multiple Analytical Techniques to Confirm Improved Optical Modeling of $SnO_2$: F Films by Atomic Forc Microscopy and Spectroscopic Ellipsometry", J. Vac. Sci. Technol. B 14(6) Nov./Dec. 1996, pp. 3436–3444, (1996).

Sanyal et al., "Chemical Vapour Deposition of Hot End Coatings on Glass from Stannic Chloride", *Glass Technology*, vol. 23, No. 6, pp. 271–276, Dec. 1982.

European Search Report, Sep. 5, 2000.

*Primary Examiner*—Alan Diamond
(74) *Attorney, Agent, or Firm*—Merchant & Gould

(57) ABSTRACT

In a transparent layered product in which a coating film having a surface with roughness is formed on a glass sheet, the reflectance of the transparent layered product is decreased by controlling the refractive index distribution in a transition layer produced by the roughness. In the transition layer present at the surface of the coating film, in which the refractive index varies continuously in its thickness direction, the variation in refractive index in the thickness direction was indicated by a convex curve over the whole area of the transition layer, when the variation is shown on a plane defined by a horizontal axis indicating a refractive index and the vertical axis indicating the thickness direction of the transition layer, with the glass sheet positioned on the lower side.

9 Claims, 8 Drawing Sheets

FOREIGN PATENT DOCUMENTS

| | | |
|---|---|---|
| JP | 2-503615 | 10/1990 |
| JP | 4-133360 | 5/1992 |
| JP | 5-157902 | 6/1993 |
| JP | 7-41337 | 2/1995 |
| JP | 7-29402 | 4/1995 |
| WO | WO 98/06675 | 2/1998 |

* cited by examiner

TRANSPARENT LAYERED PRODUCT AND GLASS ARTICLE USING THE SAME

FIELD OF THE INVENTION

The present invention relates to a transparent layered product including a glass sheet and a coating film with a rough surface and a glass article using the same (for example, a photoelectric conversion device, a multiple-glazing unit, or the like).

BACKGROUND OF THE INVENTION

A transparent layered product in which a thin film such as a tin oxide film or the like is formed on a glass sheet has been used widely for a thin film photoelectric conversion device (a thin film solar cell), heat-reflecting glass, or the like. For example, JP 7-29402 B describes heat-reflecting glass formed by stacking a silicon film, a silicon oxide film, and a tin oxide film on a glass sheet in this order.

Tin oxide in a film formed by pyrolysis on a high-temperature substrate becomes a polycrystalline film. The polycrystalline product of tin oxide has a surface with roughness caused by the growth of crystal grains according to the increase in film thickness. In a thin film photoelectric conversion device, the surface roughness of a tin oxide film as a transparent electrode enables photovoltaic characteristics to be improved due to a light trapping effect.

For example, JP 61-288473 A discloses a thin film photoelectric conversion device including a tin oxide film having a rough surface including convex portions with heights in the range between 100 and 500 nm and intervals between respective convex portions in the range between 200 and 1000 nm. The rough surface is formed by etching after film formation.

Further, JP 2-503615 A discloses a substrate for a thin film photoelectric conversion device including a tin oxide film having a surface provided with convex portions with diameters in the range between 0.1 and 0.3 $\mu$m and the ratio of height/diameter in the range between 0.7 and 1.2. In addition, JP 2-503615 A also discloses a chemical vapor deposition method (a CVD method) using a mixed gas containing tin tetrachloride, water vapor, methyl alcohol, nitrogen and the like, which is carried out on a precut glass sheet, as a method of manufacturing a tin oxide film.

JP 4-133360 A discloses a substrate for a thin film photoelectric conversion device including a tin oxide film having a surface with pyramidal convex portions with heights in the range between 100 and 300 nm and angles with respect to the normal line of the principal plane of the substrate in the range between 30° and 60°. Similarly, JP 4-133360 A also discloses a CVD method using a mixed gas containing tin tetrachloride, oxygen, nitrogen and the like, which is carried out on a glass sheet with a temperature in the range between 350 and 500° C., as a method of manufacturing a tin oxide film.

Besides the tin oxide film, coating films formed of zinc oxide, ITO (indium tin oxide), titanium oxide, silicon oxide or the like also are formed on a glass sheet to add various functions. These coating films are formed on a glass sheet as, for example, a reflection-suppression film, an electromagnetic shielding film, an antifouling film, a low-emissivity film (Low-E film), or as a component thereof, in addition to a transparent conductive film and a heat reflecting film.

As described above, when a transparent layered product is obtained by forming a crystalline or amorphous coating film for adding various functions to a glass sheet, the light reflectance may be higher than that required in some cases. In addition, for example, when the transparent layered product is used as a substrate for a photoelectric conversion device or reflection-suppression glass, a lower reflectance is preferable. Depending on the intended use, the coloring of reflected light due to the formation of the coating film may be intended to be suppressed to a degree causing no harm to the desired appearance in some cases.

Judging from the fact that a porous surface has a refractive index distribution in the depth direction, it is conceivable that a transition layer in which the refractive index varies continuously is present at the surface of a coating film such as a tin oxide film or the like. This transition layer can affect reflected light from the transparent layered product. Conventionally, particularly in the field of photoelectric conversion devices, the heights and intervals of convex portions of the rough surface of a tin oxide film have been adjusted. Conventionally, however, attention merely has been paid to the physical shape and size of convex or concave portions of the rough surface. The refractive index distribution in the transition layer produced at the surface of a coating film does not depend only on the shape and size of the individual convex or concave portions of the rough surface but also is affected by the distribution of them. Therefore, the refractive index distribution in the transition layer should not be evaluated based on observation of the rough surface in a very limited region by an electron microscope and is required to be evaluated based on optical measurement.

SUMMARY OF THE INVENTION

It is an object of the present invention that in a transparent layered product including a glass sheet and a coating film exhibiting various functions, the reflectance of light entering the transparent layered product is decreased by suitably controlling the refractive index distribution in a transition layer at the surface of the coating film. Further, another object of the present invention is to provide a glass article using this transparent layered product, particularly a multiple-glazing unit and a photoelectric conversion device such as a photovoltaic device.

The present inventors found that surprisingly, the aforementioned objects were able to be achieved by controlling the pattern of the variation in refractive index in a thickness direction in a transition layer present at the surface of the coating film.

The transparent layered product of the present invention includes a glass sheet and a coating film having a surface with roughness, which is formed on the glass sheet, and a transition layer in which the refractive index varies continuously in its thickness direction is present at the surface of the coating film. The variation in refractive index in the transition layer is indicated by a convex curve over the whole region of the transition layer, when the variation is shown on a plane defined by a horizontal axis indicating the refractive index and a vertical axis indicating the thickness direction of the transition layer, with the glass sheet positioned on a lower side.

When the coating film is formed as an outermost layer, the refractive index in the transition layer varies continuously in its thickness direction to approach the refractive index of air (1) from the refractive index of the coating film, in the direction of the outside air. On the other hand, when another thin film is further formed on the coating film having a surface with roughness, the refractive index in the transition layer approaches the refractive index of the another thin film while varying continuously in its thickness direction. In this case, it is preferable that the refractive index varies continuously from a refractive index $n_1$ of the coating film to a refractive index $n_2$ of the thin film formed thereon so that the variation in refractive index is indicated by a convex locus (curve) over the whole region when being shown on a plane. The magnitude correlation between the refractive index $n_1$ and the refractive index $n_2$ is not particularly limited.

In the transparent layered product, it is preferable that the coating film is a crystalline coating film. It also is preferable that the roughness is caused by crystal grains in the crystalline coating film. In this connection, the crystalline coating film may contain amorphous portions regionally, and a film with a crystalline fraction in volume of at least 50% as a whole is taken as corresponding to a "crystalline" film.

In the transparent layered product, it is preferable that the crystalline coating film contains, as a main component, at least one selected from tin oxide, zinc oxide, indium oxide, and titanium oxide. Particularly, a coating film containing tin oxide as the main component is useful for many purposes. In this specification, the "main component" denotes a component accounting for at least 50 wt.% of the whole amount.

In the transparent layered product, it is preferable that the coating film is formed on an undercoating film on the glass sheet. In this case, it is further preferable that the undercoating film is a coating film formed by pyrolysis of a material containing halogen, and the coating film has a surface with roughness caused by production of or loss after the production of compound grains of an alkaline component in the glass sheet and the halogen. Utilization of the roughness enables a transition layer having the above-mentioned refractive index distribution to be obtained easily.

In the transparent layered product, the roughness caused by a reaction product of the alkaline component in the glass may be utilized directly. In other words, in the transparent layered product of the present invention, the coating film having a surface with roughness may be a coating film formed by pyrolysis of a material containing halogen, and the coating film formed by pyrolysis may have a surface with roughness caused by production of or loss after the production of compound grains of an alkaline component in the glass sheet and the halogen. Particularly, when such production of compound grains is utilized, the coating film having a surface with roughness is not required to be a crystalline coating film.

In the transparent layered product, it is preferable that the thickness of the transition layer in the coating film corresponds to 30% or lower of the thickness of a layer having a substantially constant refractive index in the coating film. The thickness of the transition layer is not particularly limited, but preferably corresponds to at least 10% of the thickness of the layer having a substantially constant refractive index in the coating film.

In the transparent layered product, the coating film having a surface with roughness may be an insulating coating film, but a conductive coating film (a transparent conductive film) is used in a photoelectric conversion device or the like.

The transparent layered product can be used for various purposes. For example, it can be used as reflection-suppression (anti-reflection) glass, electromagnetic shielding glass, glass to be electrified for preventing fogging or the like, antifouling glass, antistatic glass, low-emissivity glass (Low-E glass), glass for information display equipment (for instance, a touch control panel), or glass for a top plate of a duplicator.

The transparent layered product may be used as a glass article by being combined with other members. For example, the present invention includes a multiple-glazing unit in which at least two transparent substrates are positioned to face each other via at least one inner layer selected from a group consisting of an air layer, an inert gas layer, and a low pressure layer and at least one of the transparent substrates is the transparent layered product. Furthermore, the multiple-glazing unit may be used for a door of a refrigerator (a refrigerated display case), and the conductive coating film (a coating film having a surface with roughness) included in the multiple-glazing unit is used as a heating element. In this case, the refrigerator is provided with an electrification device for passing a current in the conductive coating film.

In addition, for example, when the transparent layered product of the present invention is used in information display equipment, this information display equipment displays information through the transparent layered product. This information display equipment is provided with a display device for displaying information and the conductive film included in the transparent layered product serves as a transparent electrode. Furthermore, for instance, when the transparent layered product of the present invention is used in a duplicator, this duplicator optically reads information to be duplicated through the transparent layered product. In this case, the transparent layered product is used as a top plate (a document glass on which an original is placed) of the duplicator, and the conductive coating film included in the transparent layered product serves as an antistatic film.

The transparent layered product also can be used as a substrate for a photoelectric conversion device. The photoelectric conversion device includes: a transparent layered product having a glass sheet and a conductive crystalline coating film having a surface with roughness, which is formed on the glass sheet; at least one photoelectric conversion unit; and a back electrode. The surface roughness is caused by crystal grains in the crystalline coating film, and the crystalline coating film includes, at its surface, a transition layer in which the refractive index varies continuously in its thickness direction. The photoelectric conversion unit and the back electrode are stacked in this order on the crystalline coating film. When a variation in the refractive index in the transition layer is shown on a plane defined by a horizontal axis indicating the refractive index and a vertical axis indicating the thickness direction of the transition layer, with the glass sheet positioned on a lower side, the variation in the refractive index is indicated by a convex curve over a whole region of the transition layer.

DETAILED DESCRIPTION OF THE INVENTION

Preferable embodiments according to the present invention are described as follows.

Figure 1:
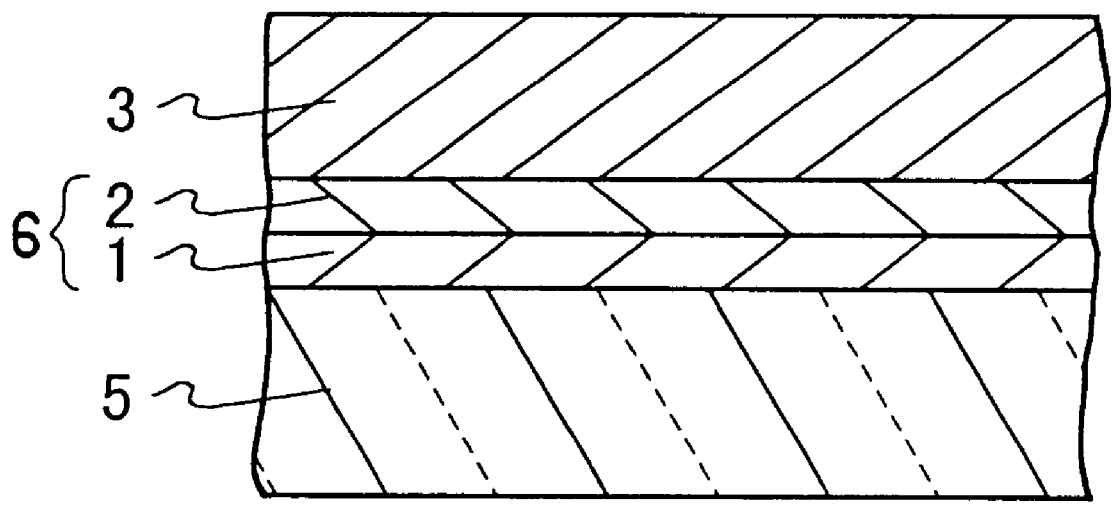
FIG. 1 is a sectional view showing an embodiment of a transparent layered product according to the present invention.

FIG. 1 is a sectional view of an embodiment of the transparent layered product according to the present invention. In this transparent layered product, an undercoating film 6 including a first undercoating layer 1 and a second undercoating layer 2, and a crystalline coating film 3 are formed on a glass sheet 5 in this order.

The following description is directed to a preferable embodiment when the crystalline coating film 3 is used as a transparent electrode in a photoelectric conversion device. As the crystalline coating film, a tin oxide film doped with a trace element such as fluorine, antimony, or the like, specifically a fluorine-containing tin oxide film (a $SnO_2$:F film) doped with fluorine at a predetermined concentration is preferable. Preferably, the fluorine concentration in the film is 0.15 wt. % or lower. This film has a refractive index of about 1.9. This crystalline coating film may contain other trace components such as silicon, aluminum, zinc, copper, indium, bismuth, gallium, boron, vanadium, manganese, zirconium, or the like. Preferably, however, the total concentration of such trace components is 0.02 wt. % or lower. It is preferable that the sheet resistance of the crystalline coating film is, specifically, in the range between 5Ω/sq.(Ω/□) and 25Ω/sq. In view of this sheet resistance, the preferable thickness of the crystalline coating film 3 is in the range between 400 nm and 1200 nm.

It is preferable that the first undercoating layer 1 has a thickness in the range between 5 nm and 100 nm and a refractive index in the range between 1.6 and 2.5. Preferably, the first undercoating layer 1 is formed of at least one selected from tin oxide, titanium oxide, and aluminum oxide. It is preferable that the second undercoating layer 2 has a thickness in the range between 5 nm and 100 nm and a refractive index in the range between 1.4 and 2.0. Preferably, the second undercoating layer 2 is formed of at least one selected from silicon oxide, aluminum oxide, and tin oxide. Furthermore, it is preferable that the refractive index of the first undercoating layer is higher than that of the second undercoating layer.

The structure of the undercoating film 6 is not limited to the two-layer structure, and the undercoating film 6 may be formed of a single layer or three layers or more. A layer in which the refractive index varies continuously may be included between the first undercoating layer and the second undercoating layer. Further, in order to improve plasma resistance, a protective film (for instance, a zinc oxide film) may be formed on the crystalline coating film.

Layers included in the undercoating film may contain, as a main component, an oxide containing at least two metals such as, for example, silicon-tin oxide (SiSnO). Other preferable examples of the layers include a film containing, as a main component, oxycarbide such as for instance silicon oxycarbide (SiOC), or oxynitride. Generally, an oxycarbide film or an oxynitride film in which carbon or nitrogen is introduced has a slightly higher refractive index than that of an oxide film.

As described above, the transparent layered product of the present invention can be used not only for a photoelectric conversion device but also in a wide variety of technical fields. The structure, type, and thickness of a coating film are determined suitably depending on the intended use of the transparent layered product. The following description is directed to an example of a preferable embodiment when the transparent layered product is used as heat-reflecting glass. Heat-reflecting glass may cause harmful light reflection to the surroundings when having an excessively high visible-light reflectance. Therefore, the above-mentioned transparent layered product also is useful as heat-reflecting glass.

When the transparent layered product is used as heat-reflecting glass, it is preferable that the crystalline coating film 3 is a tin oxide film. To this tin oxide film, other trace components may be added as described above. It is preferable that the crystalline coating film 3 has a thickness in the range between 5 nm and 20 nm. It is preferable that the first undercoating layer 1 has a thickness in the range between 5 nm and 100 nm and a refractive index in the range between 2.5 and 5.0. Preferably, the first undercoating layer 1 is formed of silicon. It is preferable that the second undercoating layer 2 has a thickness in the range between 5 nm and 100 nm and a refractive index in the range between 1.45 and 1.8. Preferably, the second undercoating layer 2 is formed of at least one selected from silicon oxide and aluminum oxide. Further, it is preferable that the refractive index of the first undercoating layer is higher than that of the second undercoating layer. Similarly in this case, the structure of the undercoating film 6 is not limited to the two-layer structure, and the undercoating film 6 may be formed of a single layer or three layers or more.

In the above, a transition layer derived from the surface roughness caused by the growth of crystal grains in the crystalline coating film was described. However, the transition layer may be derived from the roughness caused by, in the film, the presence of or the loss after production of a compound of sodium halide or the like produced on the glass sheet surface. In the case where a coating film is formed by thermally decomposing (pyrolyzing) a material containing chlorine on a glass surface, particularly when the surface temperature of the glass is high, the chlorine and sodium contained in the glass react to produce sodium chloride easily. From the examples described later, it was confirmed that the transition layer in which the variation in refractive index was indicated by a convex curve appeared at the surface of a coating film in which holes formed of the sodium chloride and by the loss of the sodium chloride produced were recognized. Similarly, in the case where a crystalline coating film is formed on an undercoating film, when the undercoating film is formed under conditions allowing sodium chloride to be produced easily, the transition layer of the crystalline coating film formed on the undercoating film tends to have refractive indexes whose variation is indicated by a convex curve.

In the above-mentioned transition layer, the variation in refractive index per unit thickness is not constant, and typically increases with distance from the glass sheet. This variation in refractive index is indicated by a convex curve in a graph over the whole region, when a horizontal axis indicates the refractive index and a vertical axis indicates the thickness direction of the transition layer, with the glass sheet positioned on the lower side. Generally, it is conceivable that such a locus of the variation in refractive index can be obtained easily when the crystal grains in the coating film have a dome shape. However, it also has been confirmed that such a locus of the variation in refractive index as described above can be obtained even when the surface has a crater shape obtained by inverting the dome shape.

It is preferable that when the coating film is used as an outermost layer, the refractive index of the transition layer varies continuously in its thickness direction from the refractive index of the coating film (for example, a refractive index of about 1.9 of tin oxide) to the refractive index of air (1). On the other hand, it is preferable that when a thin film is further formed on the coating film as in the case where the transparent layered product is used in a thin film solar cell, the refractive index in the transition layer varies continuously from the refractive index of the crystalline coating film (for example, about 1.9) to the refractive index of the thin film on the coating film (for instance, a refractive index of about 4.7 of amorphous silicon or a refractive index of about 2.8 of amorphous silicon carbide).

Further, it is preferable that the thickness of the transition layer corresponds to 30% or less of the thickness of the layer (a nontransition layer) having a substantially constant refractive index in the coating film. The reason is that when the ratio in thickness of the transition layer is 30% or less, the nontransition layer has a sufficient thickness, thus obtaining a transparent layered product taking advantage of the characteristics in refractive index of the coating film. In addition, it is preferable that the thickness of the transition layer corresponds to at least 10% of that of the nontransition layer. When the ratio in thickness of the transition layer is at least 10%, the function of the transition layer in which the refractive index varies continuously tends to be exhibited easily.

The transition layer in which the variation in refractive index is indicated by a convex curve in the graph as described above can have a lower light reflectance than that of a transition layer in which the variation in refractive index is substantially constant.

One of the methods of manufacturing the transition layer is a pyrolytic method, particularly a CVD method on a glass ribbon in a glass sheet production line by a float glass process. The manufacturing method of the transparent layered product according to the present invention is not limited to the CVD method on a glass ribbon. It has not been confirmed that the transition layer is formed without fail when a film is deposited on a glass ribbon, but the CVD method satisfies at least conditions suitable for the formation of the transition layer.

The reason that the transition layer is obtained by the film deposition on a high-temperature glass ribbon by the CVD method has not been confirmed. However, it is assumed that the crystalline nucleus present at the surface of the glass ribbon has an influence on the transition layer. When the crystalline nucleus is present at the glass surface, the growth of the crystal grains in a crystalline coating film is affected even when the coating film is formed on an undercoating film. It is conceivable that besides sodium chloride described above, for example, tin particles adhering to the surface of the glass ribbon in a float bath also contribute to the growth of the crystalline nucleus. Further, as described above, due to the produced sodium chloride itself, the transition layer tends to be formed easily.

According to the CVD method on a glass ribbon, thermal energy in forming glass also can be utilized. This preferable manufacturing method is particularly suitable for manufacturing a substrate for a photoelectric conversion device or low-emissivity glass, which may be required to be manufactured as a large product for a large window glass, roofing material, or the like. Particularly, when the CVD method is carried out in a float bath, the film deposition can be carried out on the surface of glass having a temperature equal to or higher than the softening point. The film deposition at a high temperature enables the improvements in film performance, film growth rate, and film deposition reaction efficiency. In addition, defects such as pinholes can be suppressed.

Figure 2:
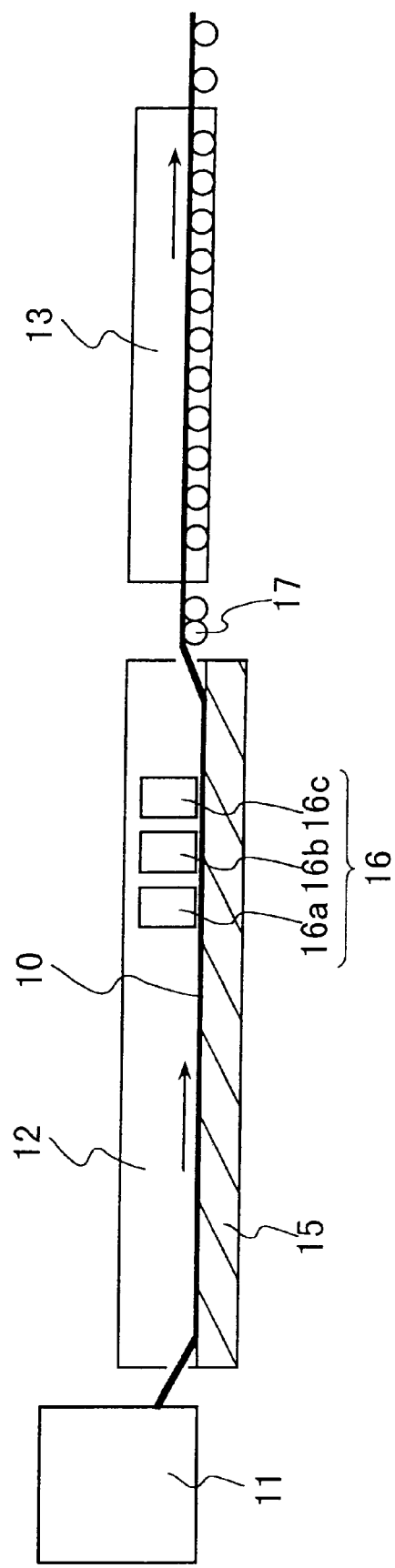
FIG. 2 is a schematic view of a device for manufacturing a transparent layered product according to the present invention.

FIG. 2 shows an embodiment of a device for depositing a film on a glass ribbon in the float glass process by the CVD method. As shown in FIG. 2, in this device, a predetermined number of coaters 16 (three coaters 16a, 16b, and 16c in the embodiment shown in the figure) are placed at a predetermined distance from the surface of a glass ribbon 10. The glass ribbon 10 is formed from molten glass, which is poured from a furnace 11 into a float bath 12, in a belt-like form on a tin bath 15 while traversing the length of the float bath 12. The number and arrangement of the coaters are selected suitably depending on the kind and thickness of a coating film to be formed. These coaters supply gaseous materials to form coating films on the glass ribbon 10 continuously. When a plurality of coaters are used, an undercoating film and a crystalline coating film can be formed on the glass ribbon 10 successively by the CVD method. The glass ribbon 10 on which the coating films including the crystalline coating film have been formed is lifted by a roller 17 and is carried into an annealing furnace 13. The glass ribbon 10 annealed in the annealing furnace 13 is cut by a cutting device, which is not shown in the figure, thus obtaining a glass sheet with a predetermined size.

Examples of the tin material in the case of using the CVD method include tin tetrachloride, dimethyltin dichloride, dibutyltin dichloride, tetramethyltin, tetrabutyltin, dioctyltin dichloride, monobutyltin trichloride, or the like, and particularly, organic tin chlorides such as dimethyltin dichloride (DMT) and monobutyltin trichloride (MBTC) are preferable. Oxidation materials used for obtaining tin oxide from the tin material include oxygen, water vapor, dry air, or the like. Examples of the fluorine material include hydrogen fluoride, trifluoroacetic acid, bromotrifluoromethane, chlorodifluoromethane, or the like. When antimony is to be added, antimony pentachloride, antimony trichloride, or the like may be used.

Silicon materials used when a suitable silicon oxide film is deposited as the undercoating film by the CVD method include silane (monosilane), disilane, trisilane, monochlorosilane, dichlorosilane, 1,2-dimethylsilane, 1,1,2-trimethyldisilane, 1,1,2,2-tetramethyl disilane, tetramethyl orthosilicate, tetraethyl orthosilicate, or the like. In this case, oxidation materials include oxygen, water vapor, dry air, carbon dioxide, carbon monoxide, nitrogen dioxide, ozone, or the like. When silane is used, for the purpose of preventing the silane from reacting before reaching the glass surface, an unsaturated hydrocarbon gas such as ethylene, acetylene, toluene, or the like may be used also.

Similarly, aluminum materials used when a suitable aluminum oxide film is deposited as the undercoating film by the CVD method include trimethylaluminum, aluminum triisopropoxide, diethylaluminum chloride, aluminum acetylacetonate, aluminum chloride, or the like. In this case, oxygen, water vapor, dry air, or the like can be used as an oxidation material.

With respect to the materials when other films are deposited by the CVD method, some specific examples of them will be described later in examples.

Figure 4:
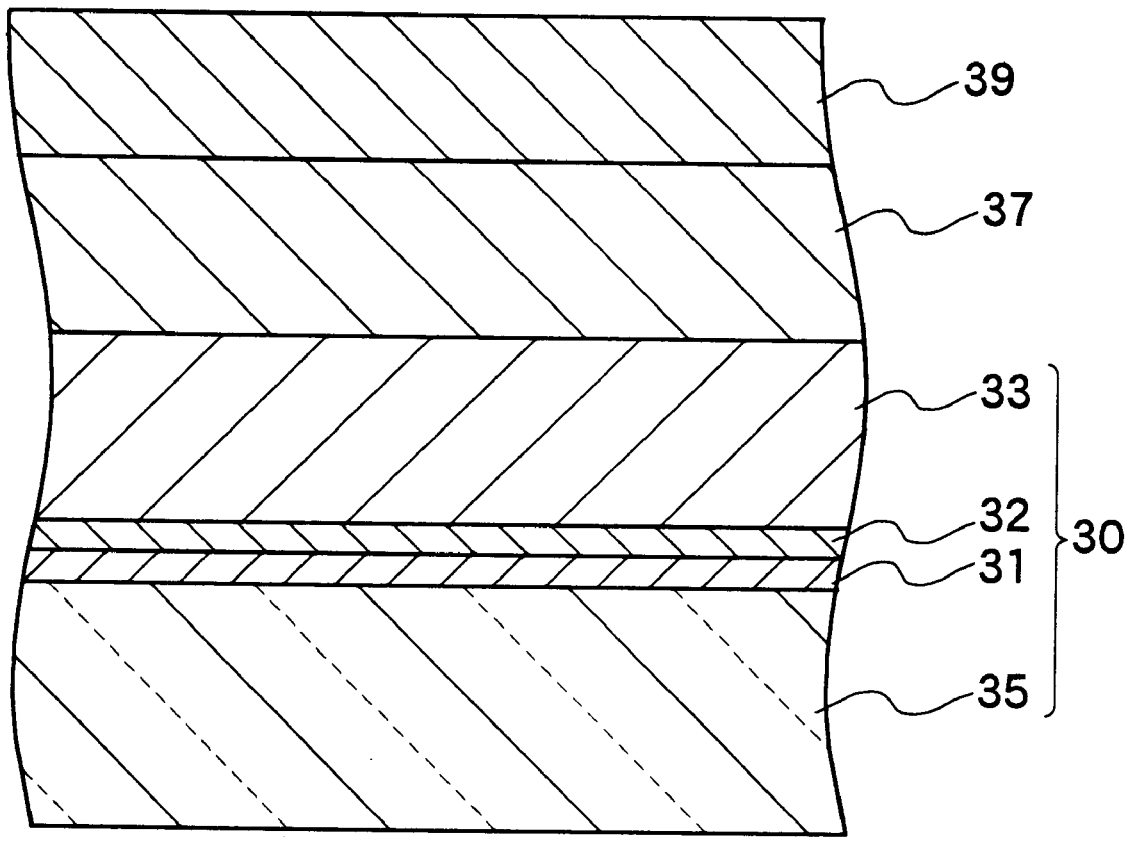
FIG. 4 is a sectional view of an embodiment of a photoelectric conversion device according to the present invention.

FIG. 4 shows a cross section of an embodiment of a thin film photoelectric conversion device (a thin film silicon-based photoelectric conversion device) using a transparent layered product of the present invention as its substrate.

In this thin film silicon-based photoelectric conversion device, on a substrate (a transparent layered product) 30 for a photoelectric conversion device in which first and second undercoating films 31 and 32 and a conductive crystalline coating film 33 are formed on a glass sheet 35 in this order, a photovoltaic unit 37 is formed and further a back electrode 39 is formed thereon.

The photovoltaic unit can be formed of a single layer as shown in the figure, but also may be formed by stacking a plurality of layers. Examples of the photovoltaic unit include a unit in which an amorphous silicon-based thin film or a crystalline silicon-based thin film is used as a photovoltaic layer (hereinafter the respective units are indicated by referring to the kind of the photovoltaic layer, such as "an amorphous silicon-based thin film photovoltaic unit" and "a crystalline silicon-based thin film photovoltaic unit").

An amorphous silicon-based thin film photovoltaic unit can be formed by depositing respective p-type, i-type, and n-type semiconductor layers in this order by a plasma CVD method. Specifically, for example, it may be formed by depositing a p-type microcrystalline silicon-based layer doped with at least 0.01 atom % boron as an impurity atom determining its conductive type, an intrinsic amorphous silicon layer to be a photovoltaic layer, and an n-type microcrystalline silicon-based layer doped with at least 0.01 atom % phosphorus as an impurity atom determining its conductive type in this order. However, these respective layers are not limited to those mentioned above. For instance, the impurity atom in the p-type microcrystalline silicon-based layer may be aluminum or the like, and an amorphous silicon-based layer may be used as the p-type layer. For the p-type layer, an alloy material of amorphous or microcrystalline silicon carbide, silicon germanium, or the like may be used.

It is preferable that the conductive type (p-type and n-type) silicon-based layers have a thickness in the range between 3 nm and 100 nm, further preferably between 5 nm and 50 nm.

It is preferable that the intrinsic amorphous silicon layer is formed by the plasma CVD method while the temperature of an undercoating is set to be 450° C. or lower. This layer is formed as a thin film of substantially an intrinsic semiconductor, with a density of impurity atoms determining its conductive type being limited to $1 \times 10^{18}$ cm$^{-3}$ or lower. It is preferable that the thickness of the intrinsic amorphous silicon layer is in the range between 0.05 $\mu$m and 0.5 $\mu$m. However, in an amorphous silicon-based thin film photovoltaic unit, an amorphous silicon carbide layer (for instance, an amorphous silicon carbide layer formed of amorphous silicon containing 10 atom % carbon or less) or an amorphous silicon germanium layer (for example, an amorphous silicon germanium layer formed of amorphous silicon containing 30 atom % germanium or less) of an alloy material may be formed instead of the intrinsic amorphous silicon layer.

Similarly, a crystalline silicon-based thin film photovoltaic unit can be formed by depositing respective p-type, i-type, and n-type semiconductor layers in this order by the plasma CVD method following the same procedure as that used for the amorphous silicon-based thin film photovoltaic unit.

It is preferable that as the back electrode, at least one metallic layer formed of at least one material selected from Al, Ag, Au, Cu, Pt, and Cr is formed by sputtering or vapor deposition. In addition, a layer formed of conductive oxide such as ITO, $SnO_2$, ZnO, or the like may be formed between the photovoltaic unit and the back electrode.

It is preferable that the photoelectric conversion device of the present invention includes a crystalline silicon-based thin film photovoltaic unit. The reason is that this unit has a lower open circuit voltage and a higher short-circuit current density than those found in an amorphous silicon-based thin film photovoltaic unit, and in this unit, therefore, the light transmittance contributes to the conversion efficiency more than the sheet resistance in the conductive film on the glass sheet does.

Similarly in this case, a material with a crystalline fraction in volume of at least 50% is taken as corresponding to a "crystalline" material even if amorphous portions are contained regionally. In addition to the amorphous or crystalline silicon, a semiconductor material containing at least 50 atom % silicon (for instance, amorphous silicon germanium) also is considered as a "silicon-based" material.

Figure 5:
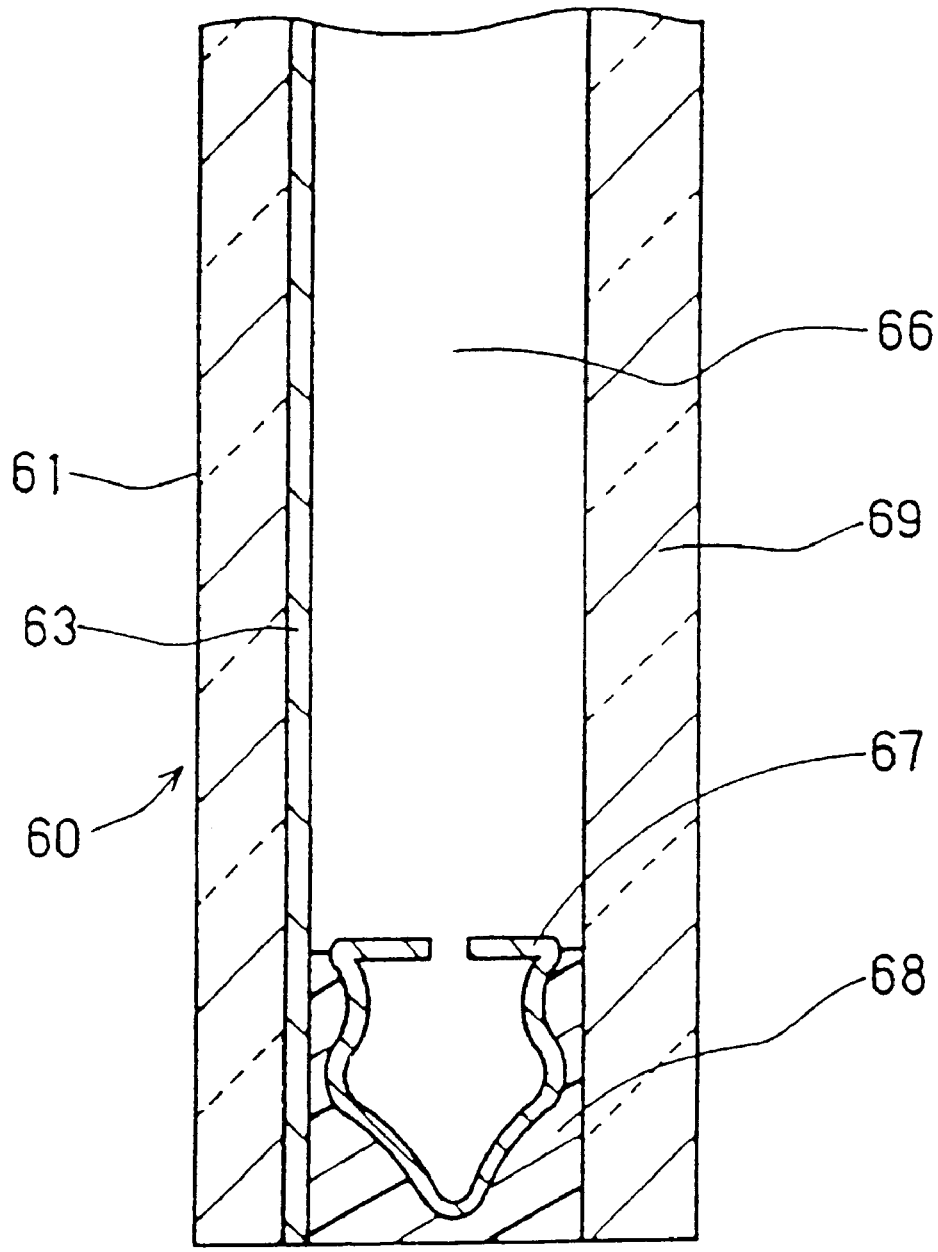
FIG. 5 is a sectional view of an embodiment of a double-glazing unit according to the present invention.

FIG. 5 is a sectional view showing an embodiment of a double-glazing unit according to the present invention. In the double-glazing unit shown in FIG. 5, a transparent layered product 60 in which a crystalline coating film 63 is formed on a glass sheet 61 is positioned so that the coating film 63 faces an air layer 66. In the transparent layered product, other layers such as an undercoating film or the like may be formed, which is not shown in the figure. Similarly in this case, as the crystalline coating film, a conductive coating film is used. The peripheries of the transparent layered product 60 and a glass sheet 69 are bonded with a sealant 68 via a spacer 67 containing a desiccant. The glass sheet 69 may be a transparent layered product in which a crystalline coating film is formed.

The air layer 66 may be formed as a low pressure layer by exhausting the inside air to reduce the pressure. When the pressure inside the air layer 66 is reduced, the insulating effect or the like can be improved further. When the low pressure layer is used, it is preferable that the peripheries of the transparent layered product and the glass sheet are sealed using, for example, low-melting-point glass instead of using the spacer 67 and the sealant 68. In this case, it is preferred to place a spacer in the low pressure layer to maintain the space between the transparent layered product and the glass sheet. Instead of the air layer 66, an inert gas layer filled with an inert gas such as an argon gas or the like may be used.

The above-mentioned double-glazing unit can be used as window glass for buildings with an improved thermal insulation property due to the low emissivity of the conductive coating film. The double-glazing unit using the transparent layered product also can be used as window glass with an excellent electromagnetic shielding characteristic. Furthermore, it also can be used as glass for a door of a refrigerated display case for shops. When it is used for a door of a refrigerator, the transparent layered product is positioned outside the refrigerator. When being used for an electromagnetic shielding window or a refrigerator, the double-glazing unit shown in the figure is further processed. For example, in the case of the former, a ground wire is provided for maintaining the conductive coating film to have ground potential. In the case of the latter, an electrode terminal is formed for utilizing the double-glazing unit as a heating element by applying voltage to the conductive coating film, and a wiring is provided for connecting the electrode terminal and a power supply.

Figure 6:
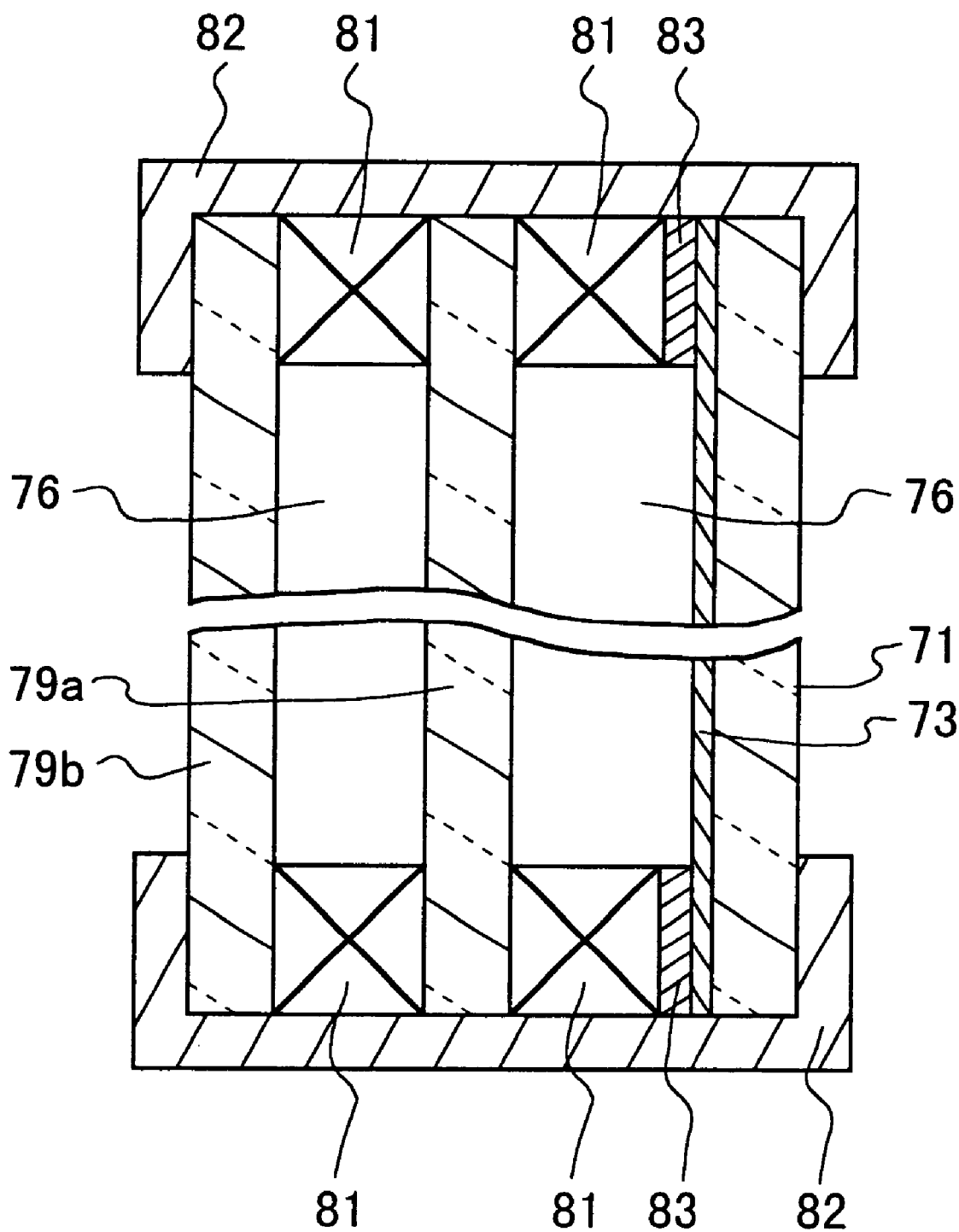
FIG. 6 is a sectional view of an embodiment of a glass door of a refrigerated display case using a transparent layered product according to the present invention.

FIG. 6 is a sectional view of an embodiment of a glass door including a transparent layered product according to the present invention. In this glass door, a transparent layered product 71 and glass sheets 79a and 79b are positioned with spaces via air layers 76 and spacers 81, which are combined to form one body using a frame 82, thus forming a multiple-glazing unit. Similarly in this multiple-glazing unit, a conductive crystalline coating film 73 is formed on the side of the air layer 76. In order to allow the coating film 73 to generate heat as a resistor, electrode terminals 83 are positioned in contact with the coating film 73 at the both ends of the coating film 73. This glass door has a function for preventing fogging caused by the heat generation and is suitable as an opening/closing door of a display-type refrigerator used frequently in shops for selling food stuffs or the like.

EXAMPLES

The present invention will be described further in detail using examples as follows, but is not limited by the following examples.

In the following examples, respective films including a crystalline coating film were deposited on a glass ribbon using a device for depositing a film as described above. The number of coaters was changed suitably depending on the number and thickness of layers to be stacked. Inside a float bath, 98 vol. % nitrogen and 2 vol. % hydrogen were supplied so that the pressure inside the bath was maintained to be slightly higher than that outside the bath, and thus the inside of the bath was maintained under a nonoxidative atmosphere. The temperature of the glass ribbon was measured using a pyrometer at a location on a slightly upstream side from the place where the films were formed.

In Examples 1 and 2, molten soda-lime silica glass (stained to have a green color) with a flat glass composition was poured into the float bath from a furnace, which then was formed into a glass ribbon with a thickness of 6 mm. On the other hand, in Examples 3 to 13, molten soda-lime silica glass (colorless) with a flat glass composition was poured into the float bath from a furnace, which then was formed into a glass ribbon with a thickness of 3 mm or 4 mm. In all of the above mentioned examples, the glass ribbon was annealed in an annealing furnace and then was cut to have a predetermined size on the further downstream side.

The following comparative examples were obtained by forming transparent layered products having the same film structures as in corresponding examples on a precut glass sheet by the CVD method. The glass sheet used in the respective comparative examples had the same thicknesses and compositions as those of the corresponding examples. The specific film deposition method will be described as follows.

Manufacture of Heat-Reflecting Glass

Example 1

From a coater positioned on the furthest upstream side, a mixed gas containing monosilane and nitrogen was supplied to deposit a silicon film with a thickness of 25 nm on a glass ribbon. Then, from a coater on the downstream side, a mixed gas containing monosilane, ethylene, oxygen, and nitrogen was supplied to deposit a silicon oxide film with a thickness of 20 nm. Subsequently, from a coater on the further downstream side, a mixed gas containing dimethyltin dichloride (vapor), oxygen, water vapor, nitrogen, and helium was supplied to deposit a tin oxide film with a thickness of 12 nm on the silicon oxide film. The temperature of the glass ribbon directly before reaching the coater on the furthest upstream side was 680° C.

Comparative Example 1

A soda-lime glass sheet with a thickness of 6 mm that had been precut to have a size of 450 mm×450 mm was placed on a mesh belt and was passed through a heating furnace to be heated up to about 600° C. While this heated glass sheet was conveyed further, from a coater installed above a glass carrier line, a mixed gas containing monosilane and nitrogen was supplied to deposit a silicon film with a thickness of 25 nm on the glass sheet. This glass sheet was annealed and then was placed on the mesh belt again and was passed through a heating furnace to be heated up to about 600° C. While this heated glass sheet was conveyed further, from a coater installed above the glass carrier line, a mixed gas containing monosilane, oxygen and nitrogen was supplied to deposit a silicon oxide film with a thickness of 20 nm on the silicon film. After being annealed, the glass sheet was placed on the mesh belt again and was passed through a heating furnace to be heated up to about 600° C. While this heated glass sheet was conveyed further, from a coater installed above the glass carrier line, a mixed gas containing monobutyltin trichloride (vapor), oxygen, water vapor, and nitrogen was supplied to deposit a tin oxide film with a thickness of 12 nm on the silicon oxide film.

Example 2

As in Example 1, a silicon film with a thickness of 25 nm, a silicon oxide film with a thickness of 20 nm, and a tin oxide film with a thickness of 12 nm were deposited sequentially on a glass ribbon. After that, from a coater positioned on the further downstream side, a mixed gas containing monosilane, ethylene, oxygen, and nitrogen was supplied to deposit a silicon oxide film with a thickness of 1 nm on the tin oxide film. The temperature of the glass ribbon directly before reaching the coater on the furthest upstream side was 680° C.

Comparative Example 2

As in Comparative Example 1, a silicon film with a thickness of 25 nm, a silicon oxide film with a thickness of 20 nm, and a tin oxide film with a thickness of about 12 nm were deposited sequentially on a glass sheet with a thickness of 6 mm. After being annealed, this glass sheet was placed on a mesh belt again and was passed through a heating furnace to be heated up to about 600° C. While this heated glass sheet was conveyed further, from a coater installed above a glass carrier line, a mixed gas containing monosilane, oxygen, and nitrogen was supplied to deposit a silicon oxide film with a thickness of 1 nm on the tin oxide film.

Manufacture of Substrate for Thin Film Photoelectric Conversion Device and Formation of Amorphous Silicon Film on the Substrate

Example 3

From a coater positioned on the furthest upstream side, a mixed gas containing monosilane, ethylene, oxygen, and nitrogen was supplied to deposit a silicon oxide film with a thickness of 40 nm on a glass ribbon. Subsequently, from a coater on the downstream side, a mixed gas containing dimethyltin dichloride (vapor), oxygen, water vapor, nitrogen, helium, and hydrogen fluoride was supplied to deposit a fluorine-containing tin oxide ($SnO_2$:F) film with a thickness of 720 nm on the silicon oxide film. The temperature of the glass ribbon directly before reaching the coater on the furthest upstream side was 700° C.

On the $SnO_2$:F film on the glass sheet obtained by cutting the glass ribbon, an amorphous silicon carbide layer (a p-type layer) with a thickness of 10 nm was deposited using monosilane, methane, and diborane as raw materials by the plasma CVD method.

Comparative Example 3

A soda-lime glass sheet with a thickness of 4 mm that had been precut to have a size of 450 mm×450 mm was placed on a mesh belt and was passed through a heating furnace to be heated up to about 600° C. While this heated glass sheet was conveyed further, from a coater installed above a glass carrier line, a mixed gas containing monosilane, oxygen, and nitrogen was supplied to deposit a silicon oxide film with a thickness of 25 nm on the glass sheet. After being annealed, this glass sheet was placed on the mesh belt again and was passed through a heating furnace to be heated up to about 600° C. While this heated glass sheet was conveyed further, from a coater installed above the glass carrier line, a mixed gas containing monobutyltin trichloride (vapor), oxygen, water vapor, nitrogen and trifluoroacetic acid was supplied to deposit a $SnO_2$:F film with a thickness of 720 nm on the silicon oxide film.

On the $SnO_2$:F film on the glass sheet, an amorphous silicon carbide layer (a p-type layer) with a thickness of 10 nm was deposited using monosilane, methane, and diborane as raw materials by the plasma CVD method.

Example 4

From a coater on the furthest upstream side, a mixed gas containing dimethyltin dichloride (vapor), oxygen, nitrogen, and helium was supplied to deposit a tin oxide film with a thickness of 25 nm on a glass ribbon. Then, from a coater on the downstream side, a mixed gas containing monosilane, ethylene, oxygen, and nitrogen was supplied to deposit a silicon oxide film with a thickness of 15 nm on the tin oxide film. Subsequently, from a coater on the further downstream side, a mixed gas containing dimethyltin dichloride (vapor), oxygen, water vapor, nitrogen, helium, and hydrogen fluoride was supplied to deposit a $SnO_2$:F film with a thickness of 720 nm on the silicon oxide film. The temperature of the glass ribbon directly before reaching the coater on the furthest upstream side was 700° C.

On the $SnO_2$:F film on the glass sheet obtained by cutting the glass ribbon, an amorphous silicon carbide layer (a p-type layer) with a thickness of 10 nm was deposited using monosilane, methane, and diborane as raw materials by the plasma CVD method. Subsequently, an amorphous silicon layer (an i-type layer) with a thickness of 300 nm was stacked using monosilane as a raw material by the same plasma CVD method.

Comparative Example 4

A soda-lime glass sheet with a thickness of 4 mm that had been precut to have a size of 450 mm×450 mm was placed on a mesh belt and was passed through a heating furnace to be heated up to about 600° C. While this heated glass sheet was conveyed further, from a coater installed above a glass carrier line, a mixed gas containing dimethyltin dichloride (vapor), oxygen, nitrogen, and helium was supplied to deposit a tin oxide film with a thickness of 25 nm on the glass sheet. After being annealed, this glass sheet was placed on the mesh belt again and was passed through a heating furnace to be heated up to about 600° C. While this heated glass sheet was conveyed further, from a coater installed above the glass carrier line, a mixed gas containing monosilane, oxygen and nitrogen was supplied to deposit a silicon oxide film with a thickness of 15 nm on the tin oxide film. After being annealed, the glass sheet was placed on the mesh belt again and was passed through a heating furnace to be heated up to about 600° C. While this heated glass sheet was conveyed further, from a coater installed above the glass carrier line, a mixed gas containing monobutyltin trichloride (vapor), oxygen, water vapor, nitrogen, and trifluoroacetic acid was supplied to deposit a $SnO_2$:F film with a thickness of 720 nm on the silicon oxide film.

On the $SnO_2$:F film on the glass sheet, an amorphous silicon carbide layer (a p-type layer) with a thickness of 10 nm was deposited using monosilane, methane, and diborane as raw materials by the plasma CVD method. Subsequently, an amorphous silicon layer (an i-type layer) with a thickness of 300 nm was stacked using monosilane as a raw material by the same plasma CVD method.

Manufacture of Low-Emissivity Glass

Example 5

As in Example 4, a tin oxide film with a thickness of 25 nm, a silicon oxide film with a thickness of 25 nm, and a $SnO_2$:F film with a thickness of 350 nm were deposited sequentially on a glass ribbon. The temperature of the glass ribbon directly before reaching the coater on the furthest upstream side was 650° C. The above-mentioned thickness of the $SnO_2$:F film is in a preferable range for use as low-emissivity glass.

Comparative Example 5

As in Comparative Example 4, a tin oxide film with a thickness of 25 nm, a silicon oxide film with a thickness of 25 nm, and a $SnO_2$:F film with a thickness of 350 nm were deposited sequentially on a glass sheet.

Manufacture of Electromagnetic Shielding Glass

Example 6

As in Example 4, a tin oxide film with a thickness of 35 nm, a silicon oxide film with a thickness of 30 nm, and a $SnO_2$:F film with a thickness of 520 nm were deposited sequentially on a glass ribbon. The temperature of the glass ribbon directly before reaching the coater on the furthest upstream side was 680° C. The above-mentioned thickness of the $SnO_2$:F film is in a preferable range for use as electromagnetic shielding glass.

Comparative Example 6

As in Comparative Example 4, a tin oxide film with a thickness of 35 nm, a silicon oxide film with a thickness of 30 nm, and a $SnO_2$:F film with a thickness of 520 nm were deposited sequentially on a glass sheet.

Manufacture of Glass for Door of Refrigerator

Example 7

As in Example 4, a tin oxide film with a thickness of 45 nm, a silicon oxide film with a thickness of 40 nm, and a $SnO_2$:F film with a thickness of 420 nm were deposited sequentially on a glass ribbon. The temperature of the glass ribbon directly before reaching the coater on the furthest upstream side was 680° C. The above-mentioned thickness of the $SnO_2$:F film is in a preferable range for use as a glass door of a refrigerated display case.

Comparative Example 7

As in Comparative Example 4, a tin oxide film with a thickness of 45 nm, a silicon oxide film with a thickness of 40 nm, and a $SnO_2$:F film with a thickness of 420 nm were deposited sequentially on a glass sheet.

Manufacture of Glass for Information Display Equipment

Example 8

As in Example 4, a tin oxide film with a thickness of 25 nm, a silicon oxide film with a thickness of 20 nm, and a $SnO_2$:F film with a thickness of 270 nm were deposited sequentially on a glass ribbon. The temperature of the glass ribbon directly before reaching the coater on the furthest upstream side was 680° C. The above-mentioned thickness of the $SnO_2$:F film is in a preferable range for use as glass for information display equipment.

Comparative Example 8

As in Comparative Example 4, a tin oxide film with a thickness of 25 nm, a silicon oxide film with a thickness of 20 nm, and a $SnO_2$:F film with a thickness of 270 nm were deposited sequentially on a glass sheet.

Manufacture of Glass for Top Plate of Duplicator

Example 9

As in Example 3, a silicon oxide film with a thickness of 20 nm and a $SnO_2$:F film with a thickness of 40 nm were deposited sequentially on a glass ribbon. The temperature of the glass ribbon directly before reaching the coater on the furthest upstream side was 680° C. The above-mentioned thickness of the $SnO_2$:F film is in a preferable range for use as antistatic glass used for a top plate of a duplicator or the like.

Comparative Example 9

As in Comparative Example 3, a silicon oxide film with a thickness of 20 nm and a $SnO_2$:F film with a thickness of 40 nm were deposited sequentially on a glass sheet.

Manufacture of Antifouling Glass

Example 10

From a coater on the furthest upstream side, a mixed gas containing dimethyltin dichloride (vapor), oxygen, nitrogen, and helium was supplied to deposit a tin oxide film with a thickness of 35 nm on a glass ribbon. Then, from a coater on the downstream side, a mixed gas containing monosilane, ethylene, oxygen, and nitrogen was supplied to deposit a silicon oxide film with a thickness of 25 nm on the tin oxide film. Subsequently, from a coater on the further downstream side, a mixed gas containing titanium isopropoxide (vapor), oxygen, water vapor, nitrogen, helium, and trifluoroacetic acid was supplied to deposit a titanium oxide film with a thickness of 250 nm on the silicon oxide film. From a coater positioned on the further downstream side, a mixed gas containing monosilane, ethylene, oxygen, and nitrogen was supplied to deposit a silicon oxide film with a thickness of 10 nm on the titanium oxide film. The temperature of the glass ribbon directly before reaching the coater on the furthest upstream side was 700° C.

Comparative Example 10

A soda-lime glass sheet with a thickness of 4 mm that had been precut to have a size of 450 mm×450 mm was placed on a mesh belt and was passed through a heating furnace to be heated up to about 600° C. While this heated glass sheet was conveyed further, from a coater installed above a glass carrier line, a mixed gas containing dimethyltin dichloride (vapor), oxygen, nitrogen, and helium was supplied to deposit a tin oxide film with a thickness of 35 nm on the glass sheet. After being annealed, this glass sheet was placed on the mesh belt again and was passed through a heating furnace to be heated up to about 600° C. While this heated glass sheet was conveyed further, from a coater installed above the glass carrier line, a mixed gas containing monosilane, oxygen and nitrogen was supplied to deposit a silicon oxide film with a thickness of 25 nm on the tin oxide film. After being annealed, the glass sheet was placed on the mesh belt again and was passed through a heating furnace to be heated up to about 600° C. While this heated glass sheet was conveyed further, from a coater installed above the glass carrier line, a mixed gas containing titanium isopropoxide (vapor), oxygen, water vapor, nitrogen, helium, and trifluoroacetic acid was supplied to deposit a titanium oxide film with a thickness of 250 nm on the silicon oxide film. After being annealed, this glass sheet was placed on the mesh belt again and was passed through a heating furnace to be heated up to about 600° C. While this heated glass sheet was conveyed further, from a coater installed above the glass carrier line, a mixed gas containing monosilane, oxygen, and nitrogen was supplied to deposit a silicon oxide film with a thickness of 10 nm on the titanium oxide film.

Manufacture of Anti-Reflecting Glass

Example 11

From a coater on the furthest upstream side, a mixed gas containing titanium isopropoxide (vapor), tetraethoxysilane (vapor), oxygen, water vapor, nitrogen, helium, and trifluoroacetic acid was supplied to deposit a titanium-silicon oxide film with a thickness of 130 nm on a glass ribbon. Subsequently, from a coater on the downstream side, a mixed gas containing monosilane, ethylene, oxygen, and nitrogen was supplied to deposit a silicon oxide film with a thickness of 90 nm on the titanium-silicon oxide film. The temperature of the glass ribbon directly before reaching the coater on the furthest upstream side was 700° C.

Comparative Example 11

A soda-lime glass sheet with a thickness of 3 mm that had been precut to have a size of 450 mm×450 mm was placed on a mesh belt and was passed through a heating furnace to be heated up to about 600° C. While this heated glass sheet was conveyed further, from a coater installed above a glass carrier line, a mixed gas containing titanium isopropoxide (vapor), tetraethoxysilane (vapor), oxygen, water vapor, nitrogen, helium, and trifluoroacetic acid was supplied to deposit a titanium-silicon oxide film with a thickness of 130 nm on the glass sheet. After being annealed, this glass sheet was placed on the mesh belt again and was passed through a heating furnace to be heated up to about 600° C. While this heated glass sheet was conveyed further, from a coater installed above the glass carrier line, a mixed gas containing monosilane, oxygen and nitrogen was supplied to deposit a silicon oxide film with a thickness of 90 nm on the titanium-silicon oxide film.

Example 12

From a coater on the furthest upstream side, a mixed gas containing $SiH_2Cl_2$, ethylene, oxygen, and nitrogen was supplied to deposit a silicon oxide film with a thickness of 100 nm on a glass ribbon. The temperature of the glass ribbon directly before reaching the coater on the furthest upstream side was 710° C.

Comparative Example 12

A soda-lime glass sheet with a thickness of 3 mm that had been precut to have a size of 450 mm×450 mm was placed on a mesh belt and was passed through a heating furnace to be heated up to about 600° C. While this heated glass sheet was conveyed further, from a coater installed above a glass carrier line, a mixed gas containing $SiH_2Cl_2$, ethylene, oxygen, and nitrogen was supplied to deposit a silicon oxide film with a thickness of 100 nm on the glass sheet.

The coating film obtained according to Example 12 was observed by an electron microscope. In the coating film, sodium chloride was contained and many holes also were confirmed, which seemed to be produced due to the dissociation of the sodium chloride. It is surmised that the sodium chloride was produced by the reaction between sodium in the glass and chlorine in the mixed gas. On the other hand, in the coating film obtained according to Comparative Example 12, neither sodium chloride nor holes were found. It is conceivable that the use of a material containing chlorine and a high film formation temperature are required for the production of sodium chloride. It was confirmed that the silicon oxide film was a substantially amorphous film.

Manufacture of High-Reflectivity Glass

Example 13

From a coater on the furthest upstream side, a mixed gas containing monosilane and nitrogen was supplied to deposit a silicon film with a thickness of 30 nm on a glass ribbon. Then, from a coater on the downstream side, a mixed gas containing monosilane, ethylene, oxygen, and nitrogen was supplied to deposit a silicon oxide film with a thickness of 50 nm on the silicon film. Subsequently, from a coater on the further downstream side, a mixed gas containing dimethyltin dichloride (vapor), oxygen, water vapor, nitrogen, and helium was supplied to deposit a tin oxide film with a thickness of about 90 nm on the silicon oxide film. The temperature of the glass ribbon directly before reaching the coater on the furthest upstream side was 680° C.

Comparative Example 13

A soda-lime glass sheet with a thickness of 3 mm that had been precut to have a size of 450 mm×450 mm was placed on a mesh belt and was passed through a heating furnace to be heated up to about 600° C. While this heated glass sheet was conveyed further, from a coater installed above a glass carrier line, a mixed gas containing monosilane and nitrogen was supplied to deposit a silicon film with a thickness of 30 nm on the glass sheet. After being annealed, this glass sheet was placed on the mesh belt again and was passed through a heating furnace to be heated up to about 600° C. While this heated glass sheet was conveyed further, from a coater installed above the glass carrier line, a mixed gas containing monosilane, ethylene, oxygen, and nitrogen was supplied to deposit a silicon oxide film with a thickness of 50 nm on the silicon film. After being annealed, the glass sheet was placed on the mesh belt again and was passed through a heating furnace to be heated up to about 600° C. While this heated glass sheet was conveyed further, from a coater installed above the glass carrier line, a mixed gas containing dimethyltin dichloride (vapor), oxygen, water vapor, nitrogen, and helium was supplied to deposit a tin oxide film with a thickness of 90 nm on the silicon oxide film.

The reflectances and transmittances of samples obtained according to the above-mentioned examples and comparative examples were measured by a spectrophotometer, thus obtaining visible-light reflectances and visible-light transmittances. Furthermore, with respect to respective thin films, corresponding single-layer films with a smooth surface were produced, and the wavelength distribution of the refractive index and extinction coefficient of respective single-layer films was determined by measurement using a spectral ellipsometer, which was used for the following optical calculation. The thicknesses of respective transition layers were measured by an interatomic force microscope to obtain rough values. After that, the following optical calculation was carried out using the thickness of each transition layer as a parameter, thus specifying the thickness of each transition layer over a larger area.

Figure 3:
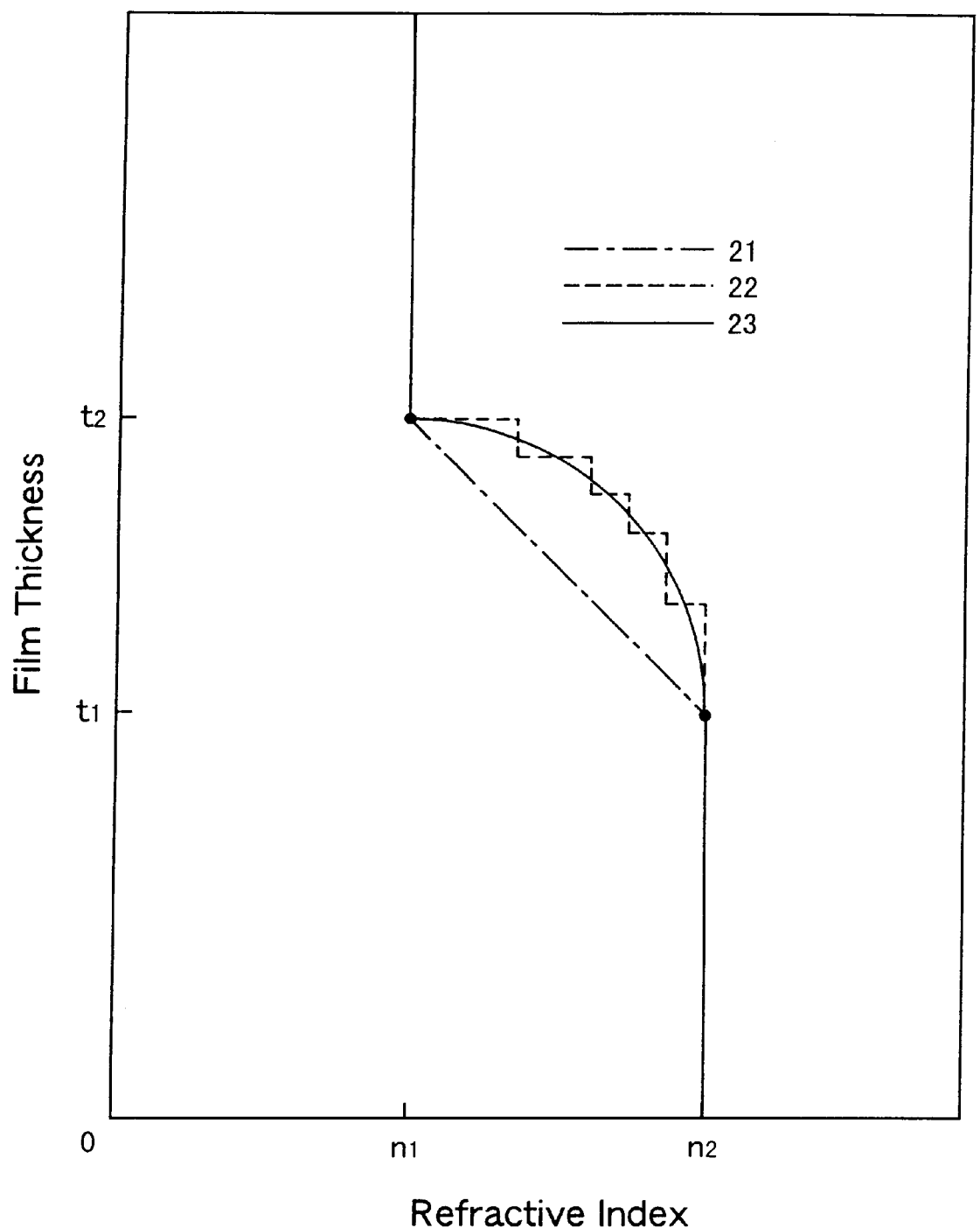
FIG. 3 is a graph showing an example of refractive index distribution in a transition layer of a crystalline coating film in a transparent layered product according to the present invention.

It has been well known that if the refractive index and extinction coefficient of respective films were given, the reflectance and transmittance, further the visible-light reflectance and the visible-light transmittance of a multilayered film, can be calculated by an optical calculation. Therefore, the transition layers of respective coating films were divided in their thickness direction, and refractive index distribution models were made by presuming the refractive indexes of respective portions individually. Then, a model most corresponding to the data obtained by the calculation was picked out. Specifically, as shown in FIG. 3, the transition layer was divided in the direction of its thickness ($t_2-t_1$: the principal plane of the glass sheet was set to be 0) and the variation in refractive index ($n_1-n_2$: wherein $n_1$ denotes the refractive index of a medium (a thin film or air) on the coating film, and $n_2$ indicates the refractive index of the coating film) was allocated to the respective divided portions. The transition layer was divided into at least eight portions in its thickness direction to carry out the allocation.

As a result, as in a typical example shown in FIG. 3, the refractive index distribution in the transition layer in each example was able to be better approximated to a model 22. From this, it is conceivable that the actual refractive index distribution of each example is indicated by a curved line such as a curved line 23. This curved line has a convex shape as a whole and no point of inflection. On the other hand, the refractive index distribution assumed from the model most approximated from the results of the respective comparative examples was indicated by a straight line 21 pattern. The point ($n_p$, $t_p$) on the curved line 23 and the point ($n_q$, $t_q$) on the straight line 21 extending between the both ends (points ($n_1$, $t_1$) and ($n_2$, $t_2$)) of the transition layer have a relationship of $t_p > t_q$ over the whole region of the transition layer, if $n_p = n_q$. In the respective examples described above, the minimum value of $(t_p-t_q)/(t_2-t_1)$ was at least 0.05.

Tables 1 and 2 show the visible-light reflectance and the visible-light transmittance measured with respect to the respective examples and comparative examples, and the pattern of the variation in refractive index in each transition layer obtained by the above-mentioned calculation. In every example and comparative example, the ratio of the transition layer (to a nontransition layer in the coating film in which the transition layer is included) specified by the above was within a range between 10% and 30%.

Figure 7:
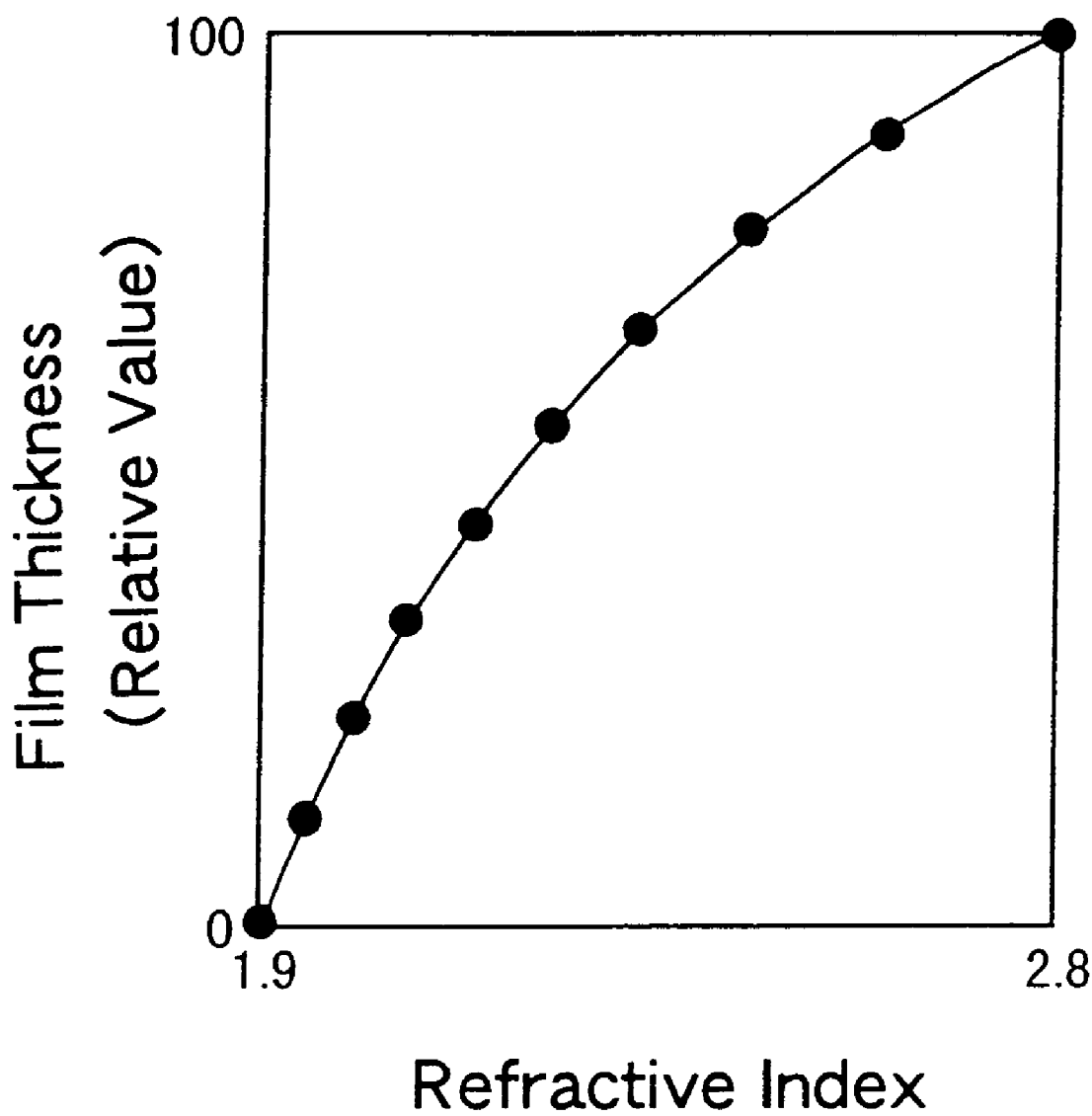
FIG. 7 is a graph showing an actual example of refractive index distribution in a transition layer of a crystalline coating film in a transparent layered product according to the present invention.
Figure 8:
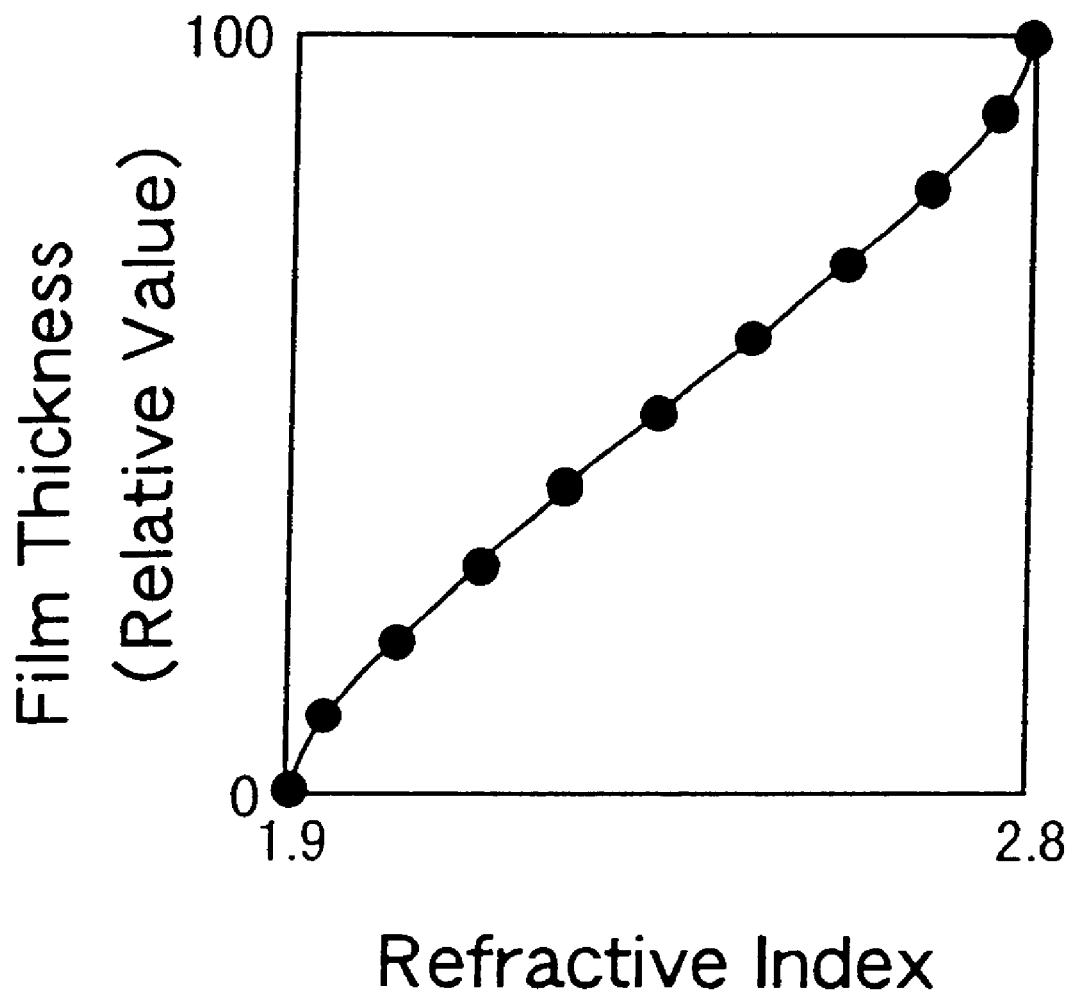
FIG. 8 is a graph showing an actual example of refractive index distribution in a transition layer of a crystalline coating film in a conventional transparent layered product.

FIGS. 7 and 8 show the variations in refractive index of the transition layers in Example 3 and Comparative Example 3, respectively.

TABLE 1

|  | Visible-Light Reflectance (%) | Visible-Light Transmittance (%) | Refractive Index Distribution |
|---|---|---|---|
| Example 1 | 41.7 | 31.9 | Convex Curve |
| Comparative Example 1 | 42.1 | 31.5 | Straight Line |
| Example 2 | 41.4 | 32.2 | Convex Curve |

TABLE 1-continued

| | Visible-Light Reflectance (%) | Visible-Light Transmittance (%) | Refractive Index Distribution |
|---|---|---|---|
| Comparative Example 2 | 42.2 | 31.4 | Straight Line |
| Example 3 | 24.9 | 67.4 | Convex Curve |
| Comparative Example 3 | 25.1 | 66.8 | Straight Line |
| Example 4 | 10.9 | — | Convex Curve |
| Comparative Example 4 | 11.1 | — | Straight Line |
| Example 5 | 10.3 | 85.4 | Convex Curve |
| Comparative Example 5 | 11.1 | 84.5 | Straight Line |
| Example 6 | 12.4 | 83.2 | Convex Curve |
| Comparative Example 6 | 13.2 | 82.4 | Straight Line |

TABLE 2

| | Visible-Light Reflectance (%) | Visible-Light Transmittance (%) | Refractive Index Distribution |
|---|---|---|---|
| Example 7 | 11.9 | 84.4 | Convex Curve |
| Comparative Example 7 | 12.4 | 83.8 | Straight Line |
| Example 8 | 9.6 | 85.8 | Convex Curve |
| Comparative Example 8 | 10.1 | 86.4 | Straight Line |
| Example 9 | 9.3 | 90.1 | Convex Curve |
| Comparative Example 9 | 9.8 | 89.7 | Straight Line |
| Example 10 | 18.4 | 73.2 | Convex Curve |
| Comparative Example 10 | 19.2 | 72.4 | Straight Line |
| Example 11 | 6.9 | 92.4 | Convex Curve |
| Comparative Example 11 | 7.4 | 91.8 | Straight Line |
| Example 12 | 5.6 | 93.8 | Convex Curve |
| Comparative Example 12 | 7.1 | 91.4 | Straight Line |
| Example 13 | 72.4 | — | Convex Curve |
| Comparative Example 13 | 72.6 | — | Straight Line |

As shown in Tables 1 and 2, the respective cases were compared to the corresponding cases using the same film structures, and it was confirmed that the decrease in reflectance and the increase in transmittance in the respective examples with the refractive index distribution indicated by a convex curve were confirmed when compared to those in the comparative examples with the refractive index distribution indicated by a straight line. In Example 4 and Comparative Example 4, absorption by the amorphous silicon layers was too great to measure the visible-light transmittance.

With respect to the transparent layered products obtained according to Example 12 and Comparative Example 12, the spectral reflectance curves were determined. As a result, the curve at the beginning on the short wavelength side in the visible region in the example was more gentle than that in the comparative example. Such flattening in the reflectance curve was preferable for avoiding the coloring of reflected light, and also results in the decrease in angular dependence of the reflected light color. In a preferable embodiment of the present invention, such preferable effects also can be obtained.

Manufacture of Photoelectric Conversion Device

Example 14

On the conductive film of the glass sheet with a conductive film according to Example 3, an amorphous silicon photovoltaic unit was formed by the plasma CVD method, thus obtaining a thin film photoelectric conversion device. In the pin junction included in the amorphous silicon photovoltaic unit, a p-type amorphous silicon carbide layer and an n-type amorphous silicon layer were used and had thicknesses of 15 nm and 30 nm, respectively. An intrinsic amorphous silicon layer (i-type) was formed by a RF plasma CVD method. As film deposition conditions, a reaction gas of silane, a pressure inside a reaction chamber of about 40 Pa, a RF power density of 15 mW/cm$^2$, and a film deposition temperature of 150° C. were used. An intrinsic amorphous silicon film deposited directly on a glass substrate to have a thickness of 300 nm under the same film deposition conditions as those described above had a dark conductivity of $5 \times 10^{-10}$ S/cm. The thickness of the intrinsic amorphous silicon layer was set to be 300 nm. Finally, as a back electrode, an ITO film with a thickness of 80 nm and an Ag film with a thickness of 300 nm were deposited on the amorphous silicon photovoltaic unit by sputtering in this order.

The output characteristics of the thin film photoelectric conversion device (with a photovoltaic area of 1 cm$^2$) thus produced were measured while light of AM1.5 (100 mW/cm$^2$) was irradiated as incident light. The results included an open circuit voltage of 0.89 V, a short-circuit current density of 16.4 mA/cm$^2$, a fill factor of 72.0%, and a conversion efficiency of 10.5%. Further, an optical degradation test was carried out by irradiating light of AM1.5 (100 mW/cm$^2$) at 48° C. After 550 hours irradiation, the conversion efficiency was deteriorated up to 8.7%.

As described above, according to the present invention, a transparent layered product with a light reflectance decreased by controlling the variation in refractive index in a transition layer can be provided. As described above, the present invention can exhibit the effects when a film is formed to add various functions. In addition, the transparent layered product of the present invention can be used as a glass article including other members. For example, when the transparent layered product is used in a photoelectric conversion device, the conversion efficiency can be improved by reducing the reflection of incident light.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A transparent layered product, comprising:
    a glass sheet;
    an undercoating film formed on the glass sheet, comprising at least two layers and having a surface with roughness; and
    a coating film having a surface with roughness, which is formed on the undercoating film,
    the coating film including, at its surface, a transition layer in which a refractive index varies continuously in a thickness direction of the transition layer,
    wherein when a variation in the refractive index is shown on a plane defined by a horizontal axis indicating the refractive index and a vertical axis indicating the thickness direction of the transition layer, with the glass sheet positioned on a lower side, the variation in the refractive index is indicated by a convex curve over a whole region of the transition layer.

2. The transparent layered product according to claim 1, wherein the coating film is a crystalline coating film, and the roughness of the crystalline coating film is caused by crystal grains in the crystalline coating film.

3. The transparent layered product according to claim 2, wherein the crystalline coating film comprises, as a main component, at least one selected from the group consisting of tin oxide, zinc oxide, indium oxide, and titanium oxide.

4. The transparent layered product according to claim 1, wherein the undercoating film is a coating film formed by thermal decomposition of a material containing halogen, and the coating film has a surface with roughness caused by production or loss after the production of compound grains of an alkaline component contained in the glass sheet and the halogen.

5. The transparent layered product according to claim 1, wherein the coating film having a surface with roughness is a coating film formed by thermal decomposition of a material containing halogen, and the coating film formed by thermal decomposition has a surface with roughness caused by production of or loss after the production of compound grains of an alkaline component contained in the glass sheet and the halogen.

6. The transparent layered product according to claim 1, wherein a thickness of the transition layer in the coating film corresponds to 30% or less of a thickness of a layer having a substantially constant refractive index in the coating film.

7. The transparent layered product according to claim 1, wherein the coating film is a conductive coating film.

8. A multiple glazing unit, comprising:
   at least two transparent substrates; and
   at least one inner layer selected from the group consisting of an air layer, an inert gas layer, and a low pressure layer,
   the at least two substrates being positioned so as to oppose each other via the at least one inner layer,
   wherein at least one of the at least two transparent substrates is a transparent layered product according to claim 1.

9. A photoelectric conversion device, comprising:
   a transparent layered product, comprising a glass sheet, an undercoating film formed on the glass sheet, the undercoating film comprising at least two layers and having a surface with roughness, and a conductive crystalline coating film formed on the undercoating film having a surface with roughness;
   at least one photoelectric conversion unit; and
   a back electrode,
   wherein the roughness of the crystalline coating film is caused by crystal grains in the crystalline coating film, the crystalline coating film including, at its surface, a transition layer in which a refractive index varies continuously in a thickness direction of the transition layer,
   the at least one photoelectric conversion unit and the back electrode are stacked in this order on the crystalline coating film, and
   wherein when a variation in the refractive index in the transition layer is shown on a plane defined by a horizontal axis indicating the refractive index and a vertical axis indicating the thickness direction of the transition layer, with the glass sheet positioned on a lower side, the variation in the refractive index is indicated by a convex curve over a whole region of the transition layer.

* * * * *